United States Patent [19]

Lenard et al.

[11] Patent Number: 4,577,533
[45] Date of Patent: Mar. 25, 1986

[54] ADJUSTING MECHANISM FOR A GRINDING WHEEL ON A SHARPENING MACHINE FOR SAWS

[75] Inventors: Peter Lenard, Biberach an der Riss; Erich Pokorny; Norbert Bailer, both of Schemmerhofen, all of Fed. Rep. of Germany

[73] Assignee: Vollmer Werke Maschinenfabrik GmbH, Biberach an der Riss, Fed. Rep. of Germany

[21] Appl. No.: 605,928

[22] Filed: May 1, 1984

[30] Foreign Application Priority Data

May 10, 1983 [DE] Fed. Rep. of Germany ....... 3317085

[51] Int. Cl.⁴ ............................................ B23D 63/14
[52] U.S. Cl. ....................................................... 76/41
[58] Field of Search ........................................ 76/41, 37

[56] References Cited

U.S. PATENT DOCUMENTS 4,436,000 3/1984 Lenard et al. ..................... 76/41

Primary Examiner—Roscoe V. Parker
Attorney, Agent, or Firm—Burns, Doane, Swecker & Mathis

[57] ABSTRACT

A carriage (28) is supported parallel to the grinding wheel axis (12) on a carrier member (20) which is reciprocable stroke-wise transversely of the grinding wheel axis (12). The grinding wheel (10) is situated on a bearing member (30) which is guided on the carriage (28) parallel to the grinding wheel axis (12) and is adapted to be advanced by an advance gear (44). The adjustment of the carriage (28) relative to the carrier member (20) is limited by a front and a back end stop (56, 58) and is further limitable by two intermediate stops (78, 78') which may be caused to reciprocate selectively between a retracted position and an operating position by a control device (110) responsive to the movements of the carrier member (20).

5 Claims, 5 Drawing Figures

ADJUSTING MECHANISM FOR A GRINDING WHEEL ON A SHARPENING MACHINE FOR SAWS

BACKGROUND AND OBJECTS OF THE INVENTION

The invention relates to an adjustment mechanism for a grinding wheel on a sharpening machine for saws, comprising
- a carrier member reciprocable strokewise transversely of the axis of the grinding wheel,
- a carriage supported on the carrier member parallel to the axis of the grinding wheel,
- a bearing member supported for advancement on the carriage, likewise parallel to the axis of the grinding wheel,
- a shaft journalled in the bearing member and supporting the grinding wheel,
- a carriage drive by means of which the carriage is reciprocable relative to the carrier member in timed relation with said carrier member's movements,
- and a front and a back end stop for limiting the adjustment of the carriage.

In known adjustment mechanism of this type, the carriage drive has the task of bringing the carriage for each working stroke of the carrier member into a position in which the grinding wheel abrades material, for example, from the cutting edge or back of a tooth to be worked; for the subsequent return stroke of the carrier member, the carriage drive brings the carriage into a retracted position in which the grinding wheel no longer touches the tooth. It is of no importance in connection with the present invention whether the carrier member is guided on a rectilinear path reciprocable along the tooth cutting edge or the tooth back, or whether it is arranged in the manner of a pendulum so that the grinding wheel can swing through a tooth space transversely of the saw blade plane each time. If a saw blade with different teeth is to be ground, for example a saw blade with alternating rough-cutting teeth of greater height and finish-cutting teeth of lesser height, it is then necessary in saw sharpening machines with known adjustment mechanisms of the kind specified to grind the rough-cutting teeth on the one hand and the finish-cutting teeth on the other hand during different passages or revolutions of the saw blade and to change the advance of the bearing member in relation to the carriage appropriately for each passage. This is time-consuming, especially as it is usually necessary to grind chamfers in addition to the tooth back faces on rough cutting teeth, for which purpose another advance of the bearing member relative to the carriage is necessary.

It is therefore an object of the invention to further develop an adjusting mechanism of the kind described at the outset so that different teeth, for example, rough-cutting and finish-cutting teeth, can be ground directly after each other in one and the same passage or revolution of the saw blade.

SUMMARY OF THE INVENTION

The object is met according to the invention in the adjustment of the carriage relative to that carrying member between the two end stops is limitable by at least one intermediate stop which may be caused to reciprocate between a retracted position and an operating position by a control device responsive to the movements of the carrier member.

The invention makes possible, for example, the following method of operation of the saw sharpening machine:

If at the beginning of a working cycle, no intermediate stop takes up its operating position, the carriage can be moved up to the front end stop so that during a working stroke of the carrier member, the grinding wheel grinds in the usual manner a limiting face of a saw tooth, for instance, a tooth back face of a finish-cutting tooth. Before the subsequent return stroke of the carrier, the carriage is displaced to the back end so that the grinding wheel is moved back along the tooth back just ground without touching the same. Before the next working stroke of the carrier, an intermediate stop is brought into its operating position in which it limits the adjustment of the carriage in forward direction before the front end stop is reached. In this position of the carriage during the next working stroke of the carrier, the tooth back of a rough-cutting tooth is, for example, ground and the subsequent return movement of the carriage is then limited by the back end stop. If then chamfers of the rough-cutting tooth are to be ground, another intermediate stop is brought into its operating position instead of the afore-mentioned intermediate stop; this intermediate stop is set such that it limits the displacement of the carriage in forward direction at a greater distance from the first end stop while the carrier carries out a further working stroke. During the next return stroke of the carrier, the carriage abuts the back end stop again. If the rough-cutting tooth is then to be given a second chamfer, a further working stroke of the carrier takes place during which the second intermediate stop again takes up its operating position. Thus, the invention makes it possible to grind rough-cutting and finish-cutting teeth of differing height in one single passage or revolution of the saw blade.

In a preferred embodiment of the adjustment mechanism according to the invention, two or more intermediate stops are provided, only one of which is movable into its operating position at one time. With at least three intermediate stops, chamfers can be ground on rough-cutting and finish-cutting teeth.

In a particularly expedient form of embodiment of the invention, at least one intermediate stop is supported eccentrically in a bushing which is situated in the carrier member transversely of the axis of the grinding wheel so as to be rotationally adjustable. Rotation of the bushing makes it possible to adjust with great accuracy the position in which the intermediate stop concerned —in so far as it occupies its operating position—interrupts the displacement of the carriage.

For the movement from its retracted position into its operating position, the intermediate stop or each intermediate stop preferably has a piston with which the associated bushing cooperates as fluid cylinder.

Finally, it is advantageous if in addition to at least one intermediate stop responsive to the control device, a manually operable intermediate stop, by means of which the return movement of the carriage relative to the carrier member can be limited, is provided.

BRIEF DESCRIPTION OF THE DRAWINGS

An example of embodiment of the invention is described below in further detail with reference to schematic drawings in which.

DETAILED DESCRIPTION OF A PREFERRED EMBODIMENT OF THE INVENTION

Figure 1:
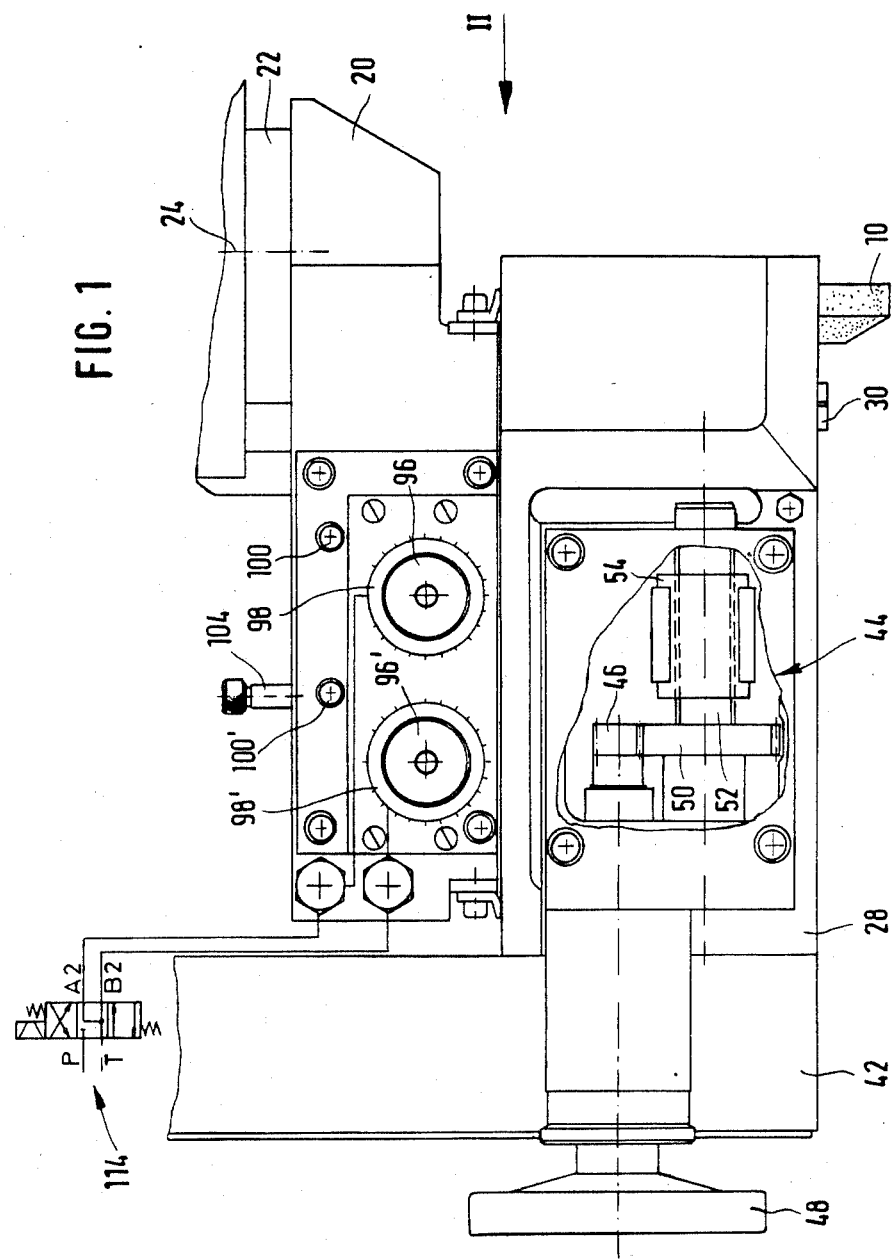
FIG. 1 is a side view of an adjustment mechanism according to the invention.
Figure 2:
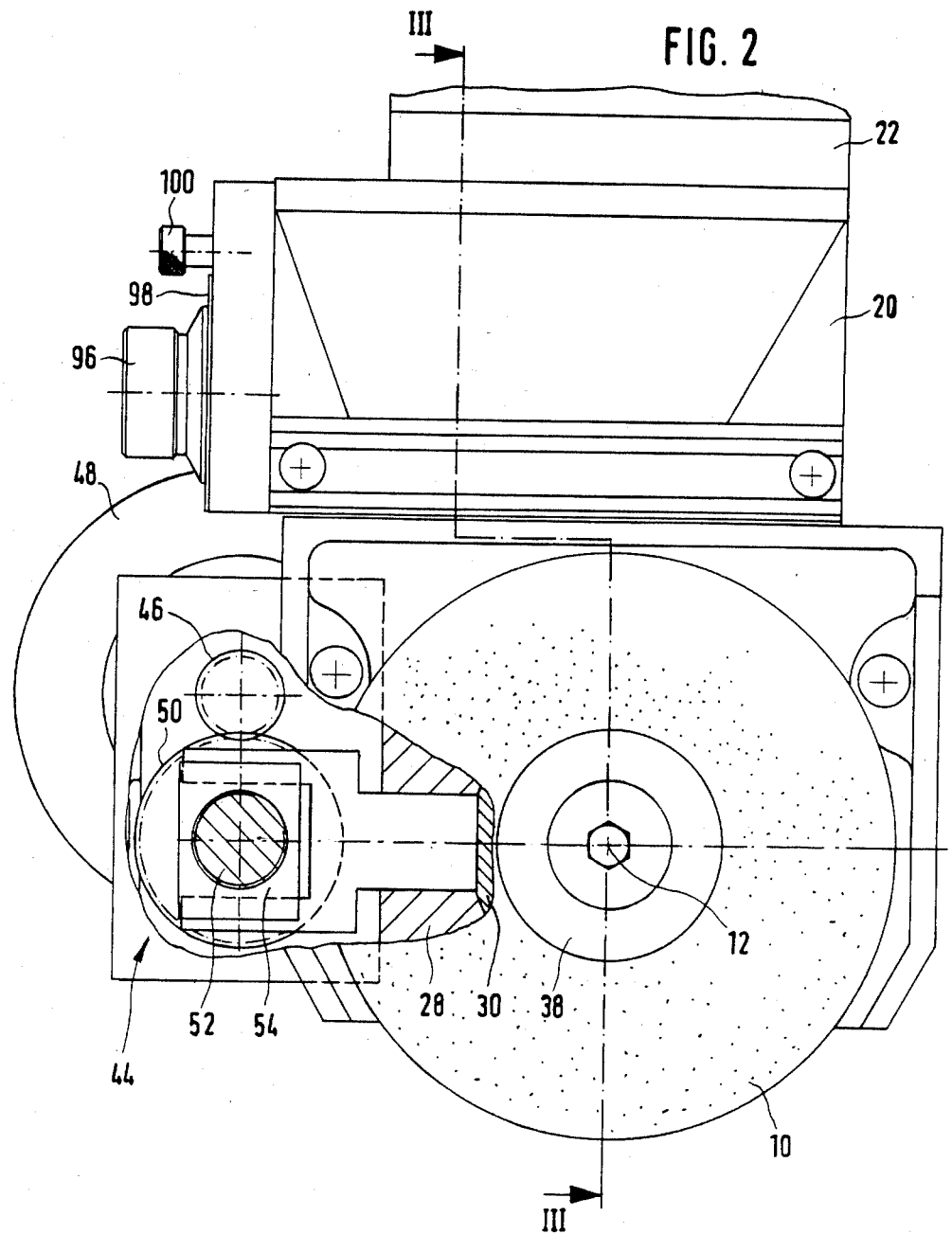
FIG. 2 is the corresponding front view in the direction of the arrow II in FIG. 1 on larger scale.
Figure 3:
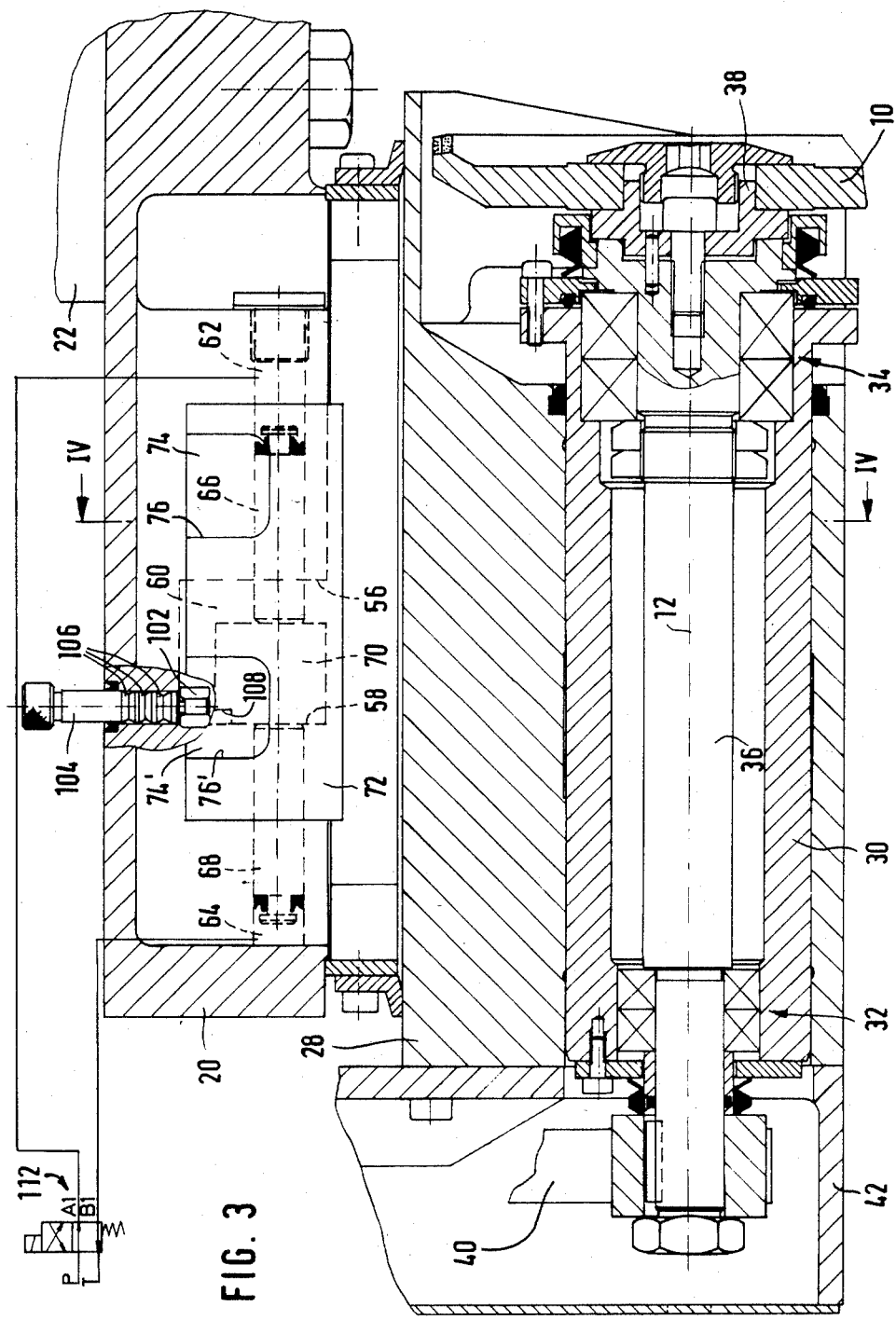
FIG. 3 is the section III—III in FIG. 2.
Figure 4:
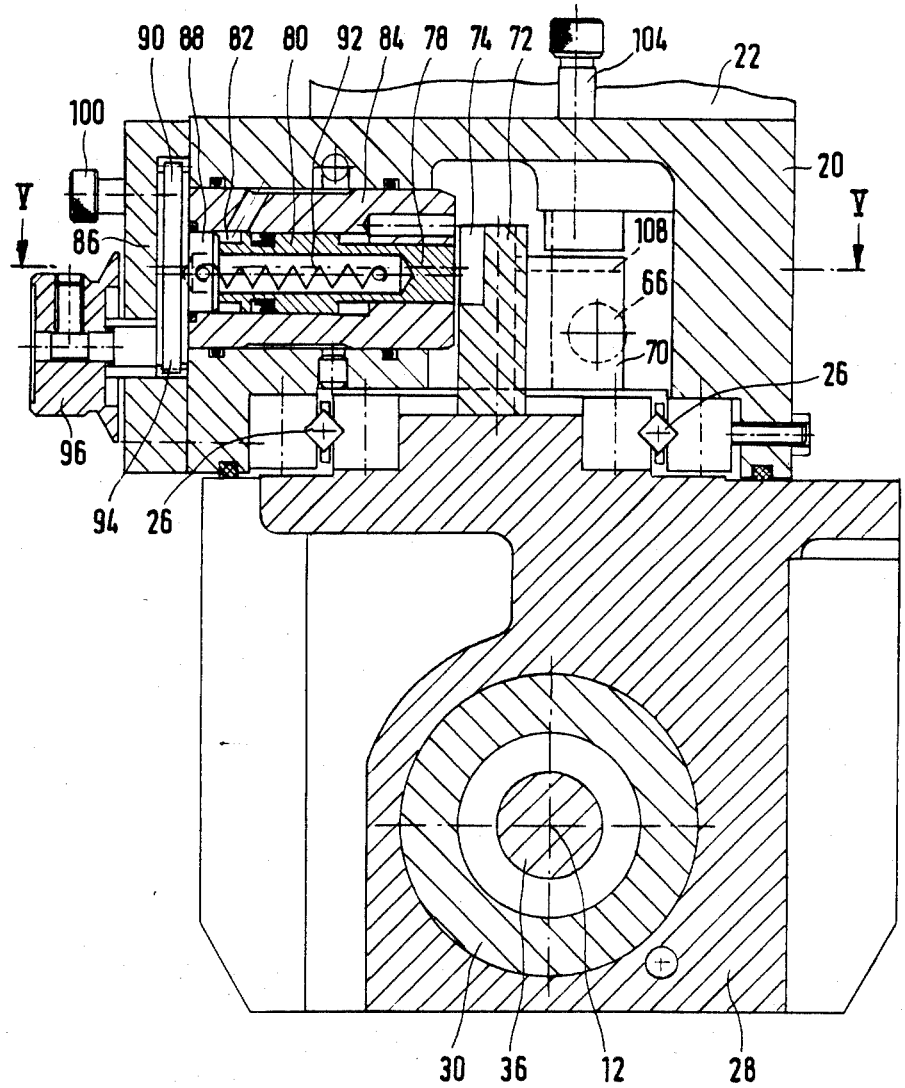
FIG. 4 is the section IV—IV in FIG. 3

The adjustment mechanism shown in FIGS. 1 to 5 belongs to a saw sharpening machine and has the task of bringing a grinding wheel 10 along its axis 12 selectively into positions in which it can grind on a saw blade 13 a back 14 of a rough-cutting tooth, chamfers 16 of the rough-cutting tooth or a back 18 of a finish-cutting tooth in successive working strokes and therebetween is retracted from the saw blade 13 by a return stroke each time.

Only those parts of the saw sharpening machine of interest in connection with the object described are shown. To these belongs a carrier member 20 which, in the example shown, is reciprocable along a rectilinear guide path 22. The guide path 22 has a path axis 24 which intersects at right angles with the axis 12 of the grinding wheel 10; the carrier member 20 is tiltably adjustable around this path axis 24 so that the grinding wheel 10 can grind selectively the straight backs 14 and 18 or the chamfers 16.

Longitudinal guides 26 are formed on the carrier member 20 and extend parallel to the axis 12 of the grinding wheel 10, thus being at right angles to the path axis 24. A carriage 28 is displaceably guided on the longitudinal guides 26. In the carriage 28, a bearing member 30, being formed in the illustrated examples as spindle sleeve, is supported such that it may be advanced parallel to the grinding wheel axis 12. In the bearing member 30, a shaft 36 is supported with a rear bearing assembly 32 a front bearing assembly 34, the front end of said shaft 36 having a mounting 38 for the grinding wheel 10 and the rear end of said shaft 36 being connected by a belt drive 40 with a drive motor (not shown) for the grinding wheel 10. The belt drive 40 is arranged in a housing 42 to which the drive motor is also secured.

An advance gear 44 is provided for advancing the bearing member 30 and thus the grinding wheel 10. To this belongs a pinion 46 which is situated in the carriage 28 and, in the example shown, is adapted to be rotated by means of a handwheel 48 or alternatively by means of an advance motor. The pinion 46 meshes with a gear wheel 50 which is secured to a threaded spindle 52 likewise situated in the carriage 28. A nut 54 is arranged on the threaded spindle 52 and is connected securely to the bearing member 30.

The greatest possible displacement of the carriage 28 in relation to the carrier member 20 is determined by a front and a back end stop 56 and 58 which define a recess 60 in the carrier member 20. The recess 60 is situated between a front and a rear cylinder bore 62 and 64 which are worked into the carrier member 20 in alignment with each other parallel to the grinding wheel axis 12 and each contain a piston 66 and 68 respectively. A block 70, which projects laterally away from a bar 72 secured to the carriage 28, is disposed between the two pistons 66 and 68.

The bar 72 has two lateral recesses 74 and 74' which are each defined by a rear side face 76 and 76' respectively and are each allocated to an intermediate stop 78 and 78' respectively. Each of the intermediate stops 78 and 78' is reciprocable between a home position in which it is inoperative and an operating position in which it cooperates with the associated side face 76 or 76'. For this purpose, the intermediate stops 78 and 78' are each integral with a piston 80 and 80' resspectively which is guided in a cylinder bore 82 and 82' respectively of a bushing 84 and 84' respectively. The cylinder bores 82 and 82' are arranged eccentrically with respect to the outer surface of the associated bushing 84 and 84' respectively; the axis 86 and 86' of this outer surface extends at right angles to the grinding wheel axis 12 and thus transversely to the longitudinal guides 26.

Each of the two cylinder bores 82 and 82' is tightly sealed at the end averted from the associated intermediate stop 78 and 78' respectively by an axle journal 88 and 88' respectively of a gear wheel 90 and 90' respectively which is rigidly fixed to the associated bushing 86 and 86' respectively. The pistons 80 and 80' are drilled hollow and each contains a tension spring 92 and 92' respectively which connects the intermediate stop 78 or 78' with the associated axle journal 88 or 88' in such a manner that the piston concerned always has the tendency to take up the inoperative position shown in FIGS. 4 and 5 in which the intermediate stop 78 or 78' concerned is inoperative.

Each of the two gear wheels 90 and 90' meshes with a pinion 94 or 94' which is situated in the carrier member 20 and is firmly connected with a control knob 96 or 96'. The reduction ratio between each of the pinions 94 and 94' and the associated gear wheel 90 or 90' amounts to 1:2; thus, for a complete revolution of one of these pinions, the associated bushing 84 or 84' carries out a half-revolution. Each of the control knobs 96 and 96' is assigned a scale 98 and 98' respectively fixed to the carrier member 20 and from this, the position of the associated intermediate stop 78 or 78' can be read. Each of the two pinions 94 and 94', and thus the associated intermediate stop 78 or 78' too, can be clamped by a clamping screw 100 and 100' respectively in the selected setting.

The two intermediate stops 78 and 78' and, as the case may be, other adjustable intermediate stops hydraulically reciprocable between an inoperative position and an operating position, are provided for limitation of the forward movement of the carriage 28. In the illustrated example of embodiment, an additional intermediate stop 102 being mechanically adjustable is arranged in the carrier member 20 to enable limitation of the return movement of the carriage 28 so that, for example, it can with certainty be avoided during tooth cutting edge grinding that the grinding wheel 10 should strike the back of the adjacent tooth as a result of too great a return movement from the cutting edge just ground. The intermediate stop 102 is formed on a pin 104 which has three annular grooves 106, each one of which interacts with a stop (not shown) resiliently supported on the carrier member 20. Thus, the pin 104 can be secured selectively in three different positions, i.e., in the inoperative position shown in FIGS. 3 and 4 in which it is inoperative, in a first operating position in which it interacts with a stop face 108 formed on the block 70 and set back, and a second operating position in which it interacts with the—in FIG. 3, left-hand—end face of the block 70.

Figure 5:
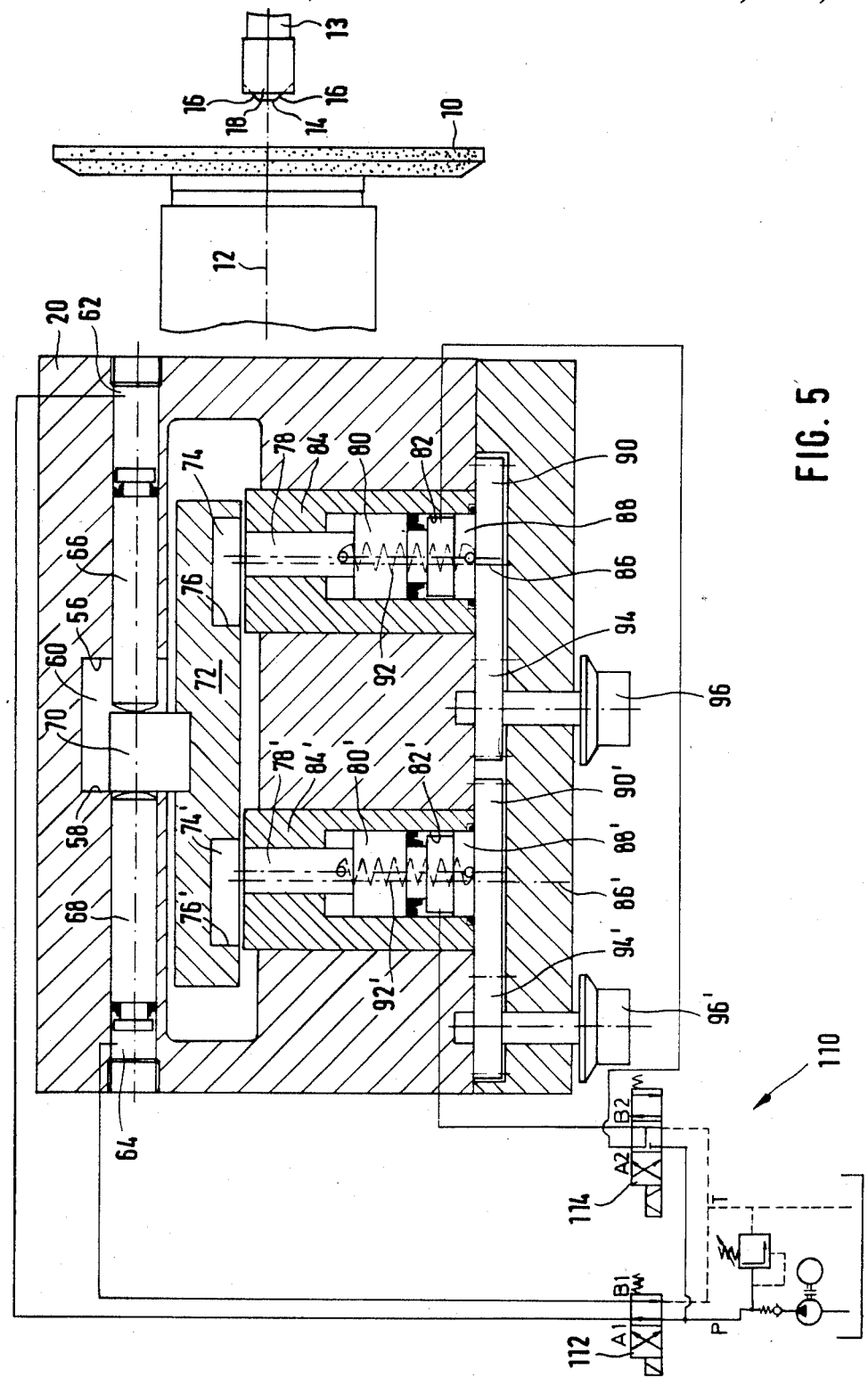
FIG. 5 is the section V—V in FIG. 4 with a circuit diagram of the adjustment mechanism.

The adjustment mechanism described up until now, essentially with reference to FIGS. 1 to 4, has an electrohydraulic control device 110 whose most important parts are shown in FIG. 5. To these parts belongs a first electromagnetically operable directional control valve 112 is connected by lines A1 and B1 to the front cylinder bore 62 and the rear cylinder bore 64 respectively and selectively connects one of these cylinder bores with a pump line P under pressure and the other cylinder bore in each case with a pressureless tank line T. A second directional control valve 114 is connected to the cylinder bore 82 and 82′ by lines A2 and B2 and selectively connects the one or other of these cylinder bores with the pump line P and the other cylinder bore in each case with the tank line T or connects both cylinder bores 82 and 82′ with the tank line T.

In order to set the described adjustment mechanism, the directional control valve 112 is switched such that it connects the pump line P via the line B1 with the rear cylinder bore 64. As a result, the rear piston 68 moves out, presses against the block 70 and thus displaces the carriage 28 to the right until the block 70 abuts the front end stop 56 with its right end face. Subsequently, the grinding wheel 10 is advanced by turning the handwheel 48 until said grinding wheel 10 during a working stroke of the carrier member 20 touches the back 18 of a finish-cutting tooth. The directional control valve 112 is thereupon reversed so that pressure oil from the pump line P arrives in the front cylinder bore 62 via the line A1, thus causing the carriage 28 to be displaced to the rear—according to FIG. 5, to the left—until the block 70 abuts the rear end stop 58. The directional control valve 114 is then switched such that it connects the pump line P via the line A2 with the cylinder bore 82 so that the intermediate stop 78 moves out into its operating position and enters the recess 74 without touching the bar 72.

If the directional control valve 112 is now reversed again and the carriage 28 is thus displaced in forward direction again, the carriage can no longer reach the front end stop 56 as the movement is interrupted by the fact that the rear side face 76 strikes the intermediate stop 78. By adjustment of the control knob 96, the carriage 28 and thus the grinding wheel 10 can be set such that its front—in FIG. 5 its right-hand—end face just touches the back 14 of a rough-cutting tooth. The carriage 28 is then moved against the rear end stop 58 again by renewed reversal of the directional control valve 112. The directional control valve 114 is subsequently controlled such that the cylinder bore 82 becomes pressureless and as a result the intermediate stop 78 is retracted into its inoperative position by the associated tension spring 92 while the intermediate stop 78′ arrives in its operating position.

The directional control valve 112 is thereupon reversed again so that the carriage 28 is again displaced in forward direction where it this time, however, strikes intermediate stop 78′. This is then set by adjustment of the control knob 96′ such that the front end face of the grinding wheel 10 touches the one or other chamfer 16 of a rough-cutting tooth when the carrier member 20 is appropriately tilted.

Finally, renewed reversal of the directional control valve 112 causes the carriage 28 to move against the rear end stop 58 again or against the mechanical intermediate stop 102 which has first of all been brought into its first or second operating position, each according to whether and to what degree limited space conditions during grinding make necessary a limitation of the return movement of the grinding wheel 10.

For the automatic operating cycle now beginning, the two directional control valves 112 and 114 are made dependent via their electromagnets on the reciprocating movements of the carrier member 20 along its guide path 22 such that recurrently, one after the other, the back 14 of a rough-cutting tooth, the two chamfers 16 of the same rough-cutting tooth and, after an advance movement of the saw blade by one tooth spacing, the back 18 of the subsequent finish-cutting tooth, are ground.

What is claimed is:

1. An adjustment mechanism for a grinding wheel on a sharpening machine for workpieces, such as saws, comprising:
   a carrier member reciprocable in a first direction;
   a carriage mounted on said carrier member for movement relative to said carrier member in a second direction which is transverse to said first direction;
   bearing means supported on said carriage for movement relative thereto in said second direction;
   a shaft rotatably carried by said bearing means for rotation about an axis extending in said second direction;
   a grinding wheel carried by said shaft so as to be rotatable with said shaft about said axis;
   front and back end stops arranged to limit the reciprocal stroke of said carriage toward and away from a workpiece;
   drive means for reciprocating said carriage between said front and back end stops in a predetermined timed relationship with movement of said carrier member;
   at least one intermediate stop movable from a retracted position to an operative position between said front and back end stops for limiting the extent of said reciprocable stroke of said carriage; and
   control means responsive to movements of said carrier member for moving said intermediate stop between said retracted position and said operative position.

2. An adjustment mechanism according to claim 1, wherein said at least one intermediate stop comprises a plurality of intermediate stops, said control means being operable to move said intermediate stops one-at-a-time into said operative position.

3. An adjustment mechanism according to claim 1 including a bushing adjustably mounted in said carrier member for rotation about a second axis disposed transversely of said first-named axis, said at least one intermediate stop being mounted eccentrically in said bushing.

4. An adjustment mechanism according to claim 3, including a fluid-driven piston attached to said intermediate stop, said piston disposed slidably in said bushing which defines a fluid cylinder.

5. An adjustment mechanism according to claim 1, wherein said intermediate stop is arranged to limit movement of said carriage toward said front end stop, and a manually movable second intermediate stop arranged to be manually moved to an operative position for limiting the extent of said reciprocable stroke of said carriage toward said back end stop.

* * * * *